Feb. 3, 1970     G. HANNAPPEL     3,493,763
LINE TRACES WITH THE LIGHT FROM A GAS DISCHARGE
LAMP DEFLECTED ACROSS THE LINE
Filed July 6, 1967     3 Sheets-Sheet 1

United States Patent Office 3,493,763
Patented Feb. 3, 1970

---

3,493,763
LINE TRACES WITH THE LIGHT FROM A GAS DISCHARGE LAMP DEFLECTED ACROSS THE LINE
Gunther Hannappel, Frankfurt am Main, Germany, assignor to Messer Griesheim G.m.b.H., Frankfurt am Main, Germany, a corporation of Germany
Filed July 6, 1967, Ser. No. 651,608
Claims priority, application Germany, July 14, 1966, M 70,230
Int. Cl. G05b 1/06
U.S. Cl. 250—202         15 Claims

ABSTRACT OF THE DISCLOSURE

A scanning arrangement on follower control devices for tracing processing machines, such as flame cutting machines, includes a light source, a light detector and an electrical control device. The light source is a gas and/or vapor discharge lamp whose beam is reproduced as alternating light variations on the pattern or original copy to be scanned.

---

Background of invention

The invention relates to an arrangement for the illumination of the area of a drawing, pattern or the like to be scanned by means of a photoelectric light detector for tracing processing machines, particularly flame cutting machines.

In known scanning arrangements of this type (German Patent 1,143,911) for the illumination of the line pattern, a line-frequency-fed, continually burning incandescent lamp is arranged to the photoelectric light detector, which is often constructed as a differential photoelectric resistor. In this connection, the optical contrast between the line and its surroundings is changed to such an electrical signal, that the position of the constructive unit consisting of the light source and the light detector is brought, kinetically for example, to a constantly uniform relative position to the line to be scanned. Among others, the disadvantage of such arrangement consists in an intense outside light sensitivity.

Other known photoelectric scanning arrangements (German patent application S 74,427 VIIb/21c) operate for the illumination of the receiver of a light beam oscillating perpendicularly to the line to be scanned. In this case, the signal necessary for the adjusting of the light source and the light detector is obtained by the electrical comparison between the instantaneous illuminated surface element to be scanned and the relative position of the light detector or detectors. In arrangements of this type the oscillating light beam is produced electromechanically by the reflection, for example, of a beam issued by an incandescent lamp on a magnetically moved mirror surface or an eccentrically arranged, kinetically rotating lens system. With respect to the scanning speeds to be conveyed to the follower control arrangements of several meters per minute in by-pass radii of a few millimeters, an oscillation frequency of the light beam of several hundred cycles per second is essential. Hence, disadvantages of the named light sources are clearly apparent. Both the mirror oscillator as well as the lens or prism system rotating by the stated frequency are susceptible to damage and are expensive because of mechanical reasons.

Summary of invention

An object of this invention is to provide a scanning device with an illuminating arrangement which overcomes the above disadvantages.

In accordance with this invention the light source is a gas- and/or vapor discharge lamp whose beam is reproduced as alternating light variations on the original copy to be scanned. The use of alternating light instead of a continuously burning incandescent lamps has the advantage that an oscillating movement of the scanning point can be achieved on the original copy, while an arrangement of mechanically moved parts, such as oscillating mirror, rotating diaphragms, etc., can be left out. This results in a reduction of the bulk to be moved for the carrying out of the controlling process and thus an increase of the operating speed of the follower control.

Xenon or argon may be advantageously employed in the gas discharge lamp. For vapor discharge, mercury is quite effective. By the choice of the corresponding gas or vapor agents and the particular combination, the parameters of the lamp can be changed in a known manner.

In a further aspect of the invention, a gas- and/or vapor discharge lamp is utilized and at least one electromagnet is arranged to the discharge of the arc lamp for the oscillating deviation. Thus in a simple manner there is an oscillation of the lamp discharge or electric arc burning between two electrodes, which oscillation is adjustable in a relatively wide range. This adjustability enables a good adaptation of the follower control to the advance speed of the cutting machine.

It is also possible to achieve the oscillation by means of a periodic change of the voltage in the lamp discharge. Such a step is more expensive, however, and is limited to special cases.

The lamp may be operated with direct current, alternating current or pulsating direct current. The electromagnets may preferably be supplied with alternating current or intermittent direct current. The type of current to be employed in the individual case, depends on the type of machines to be controlled.

With the arrangement of a single electromagnet, only an edge scanning of the drawing line is possible. Thus for obtaining a line center scanning, several electromagnets may be arranged radially symmetrically about the discharge of the arc lamp in accordance with a further aspect of the invention. Advantageously, two electromagnets at a time are disposed opposite each other.

A particularly suitable embodiment of a line center scanning consists of two magnets having a common center axis being provided about the lamp situated parallel to the original copy to be scanned wherein this axis is directed vertically to the original copy. Advantageously, even the diaphragm provided in the lamp and the optics transmitting the light spot to the original copy are preferably arranged in the same center axis. This, thereby results in a very compact unit of relatively light weight.

Another advantageous possibility of the transmittance of the light spot is in using a mirror system which transmits the light beam issuing at the diaphragm past the magnets and over an optics system to the original copy.

Scanning systems are also provided wherein the light spot is moved on the original copy, rotationally in a circular path, instead of oscillating in a plane. This rotation is achieved by means of rotating diaphragms or by a common rotation of function generator and signal converter. Even in the use of light intensity variations such a rotation of the light spot is achieveable, when a rotating deflection about its center axis is furnished to the discharge of the arc lamp. To accomplish this at least two pairs of electromagnets, and preferably more, are arranged about the gas lamp, and the center axis of the discharge of the arc lamp is directed vertically to the surface to be scanned. A switching arrangement is correlated to the electromagnet, which in a certain sequence and direction of rotation effects an agitation of the magnets and consequently a rotation of the deflected discharge of the arc lamp. The utilization of a circulating light spot for the scanning of the drawing line has the advantage of the direct arrangement of the magnet phases to the point to be scanned and the thus related very simple controllability of the scanning.

The use of the light intensity variation in the shape of a deflected discharge of the arc lamp rotating about a center axis, offers also the possibility for scanning of spatial patterns and curves. To accomplish this, two pairs of electromagnets are arranged about the discharge of the arc lamp whose center axes are vertically superimposed and pass through the center axis of the discharge filament. To each magenet pair is arranged a separate optical system, control, etc.

Instead of an electromagnetic deflection of the discharge of the arc lamp, an electrostatic deflection is also possible. This has the advantage that it can take place practically wattlessly, and the regulation of the deflection amplitude is very simple, since the static deflection is directly proportional to the voltage. The electrodes for the deflector system are advantageously applied to the outer surface of the lamp. The electrostatic deflection is of advantage particularly there where, because of construction reason, it is desirable to have a swinging of the lamp discharge in field direction instead of a swinging vertically to the field direction, as is necessarily the case in electromagnets.

According to a further proposal of the invention the discharge of the arc lamp is beamed or narrowed by means of additional electromagnetic and/or electrostatic means. In this connection, magnet coils, capacitor plates or even a static lens system, for example, can be used. The beaming of the discharge of the arc lamp offers a sharper picture of the scanning point and consequently an increase of the scanning accuracy.

The drawings

Detailed description

Figure 1:
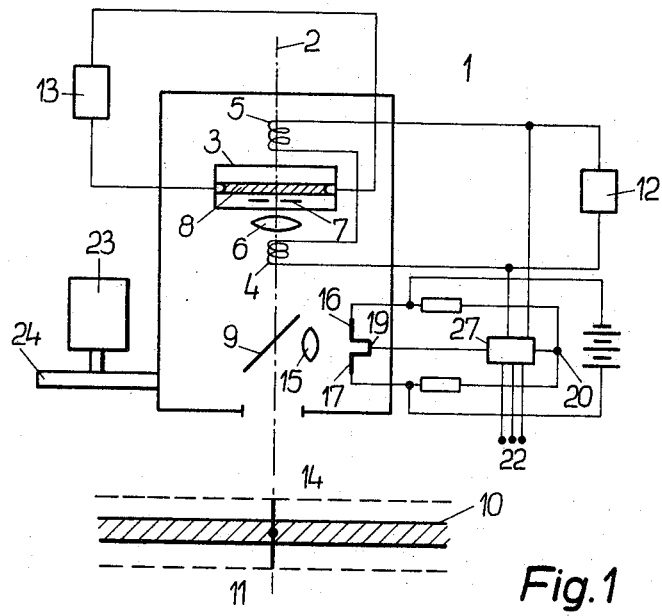
FIG. 1 shows the scanning arrangement of a follower control device of a flame cutting machine, where for the sake of simplification the current contacts, etc., required for the rotation of the scanning device, are omitted. (The line drawn under the scanning arrangement is tilted 90° from its actual plane.)
Figure 2:
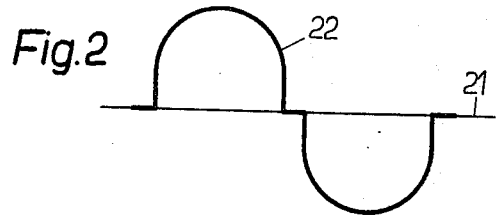
FIG. 2 shows the voltage variation when no change of the direction of movement is required.

Reference numeral 1 in FIG. 1 represents a scanning arrangement, rotatable about center axis 2, which aside from the gas discharge lamp 3 comprises the deflection magnets 4 and 5 as well as an optical system 6, which reproduces the part of the discharge filament 8 limited by diaphragm 7 through semi-transparent mirror 9 on line 10 to be scanned, preferably as dots in 11. When the magnets 4 and 5 uniformly switched in series, are supplied from the low-frequency generator 12, the discharge 8, operated by means of the power supply device 13, swings vertically to the drawing plane with the frequency impressed on the magnets depending on their phase and as oscillating light vector 14 encases line 10. The light reflected from the original copy sheet where line 10 is located reaches, by means of semi-transparent mirror 9 after being reproduced through optical system 15 with direct passage of line 10, both light detectors 16 and 17 in such a manner that preferably the parts of the light vector 14 extending over line 10 are reproduced symmetrically on the light detectors, both of which are situated in a known manner in a branch of a bridge. If this bridge is supplied with direct current 18, there results at the diagonal points 19 and 20 of the bridge—as seen in FIG. 2—a voltage 22 symmetric to zero line 21 whose frequency and phase is equal to the frequency and phase of the generator 12 effecting the deflection of the discharge 8. If then the diagonal voltage on the one side and the voltages supplied by the generator 12 on the other side are delivered to a suitable differential intensifier 27, there results at its outlet no voltage; and the polarity-dependent, two-fielded direct current motor 23 annexed at the intensifier outlet 22 remains in the rest position.

Figure 3:
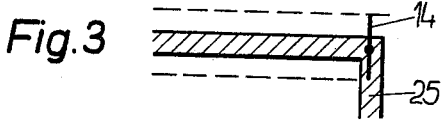
FIG. 3 shows the position of the light spot at a deflecting point.
Figure 4:
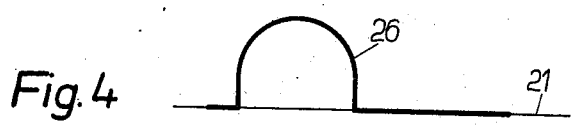
FIG. 4 shows the resulting voltage variation.

However, if as shown in FIG. 3 a rectangular line 25, for example, is scanned, there results a situation where the light vector 14 takes a course unilaterally to the entirely of the line. Thereby the light detectors 16 and 17 are illuminated at various intensities, and at points 19 and 20 (FIG. 1) there results an alternating current 26 (FIG. 4) varied from zero, and at outlet 22 of the differential intensifier 21 there results a voltage so directed that the motor 23 under interpolation of friction wheel 24 turns the scanning arrangement 1 until the light vector 14 is again vertical to the line 25 to be scanned, particularly now standing on its side drawn downwards. In a known manner, as described for example in German Patent 1,143,911, by rotating the scanning arrangement, an activation of the coordinate motors is effected for the $x$- and $y$-direction and consequently the movement direction of the cutting torch is changed accordingly.

Figure 5:
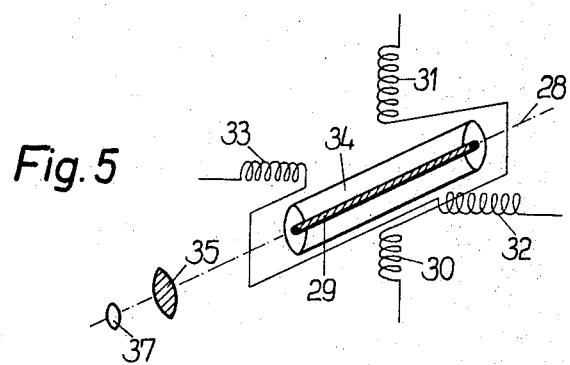
FIG. 5 shows the arrangement of the magnets and the lamp for rotating the discharge filament.
Figure 6:
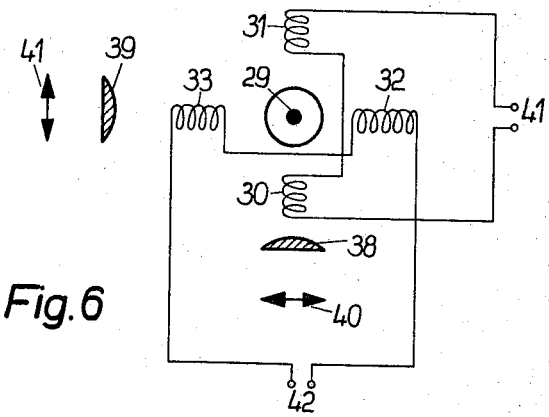
FIG. 6 shows a corresponding top view of FIG. 5.

FIGS. 5 and 6 show an arrangement of the gas discharge lamp with four electromagnets for the achievement of a rotational movement of the discharge 29 about its center axis 28. An alternating current 41 and 42 of equal frequency, but 90° out of phase, is supplied to the vertically superimposed coil pairs 30 and 31 as well as to 32 and 33 which are switched in series, synonymously wound and each provided in a line. The result is a rotation of the magnetic field vector in the interior of the discharge lamp and thus a rotation of the discharge 29.

Such an arrangement makes possible, according to FIG. 5, the producing of a light beam 37 suitable for scanning purposes and rotating about axis 28, if the projection of the filament-like discharge 29 takes place over optics 35. The light source suitable for the purpose of a spatial scanning is shown in FIG. 6. It operates according to the same magnet principle, but allows over both preferably cylindrical lenses 38 and 39, the obtainment of two vertically superimposed alternating light vectors 40 and 41, which are precisely coupled in proper phase relation.

Figure 8:
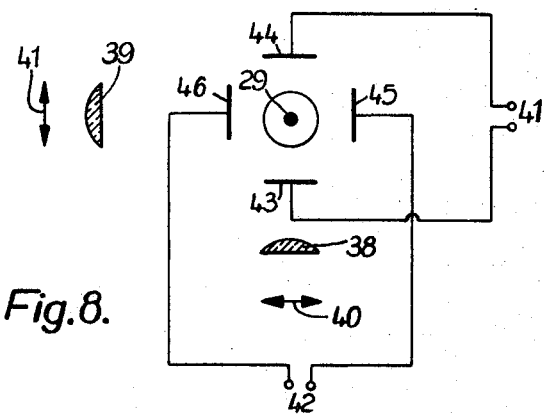
FIG. 8 is a view similar to FIG. 6 but relating to the embodiment of FIG. 7.
Figure 7:
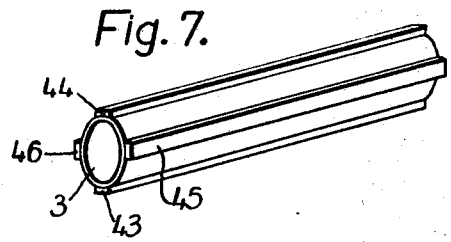
FIG. 7 is a perspective view of another embodiment of this invention incorporating electrostatic deflection means.

FIGS. 7–8 illustrate still another form of this invention which incorporates electrostatic deflection means. This arrangement is similar to that of FIGS. 5–6 but utilizes four spaced electrodes 44–46 arranged on the outer surface of lamp 3.

What is claimed is:

1. In a scanning arrangement on follower control devices for tracing processing machines including a light source, a light detector and an electrical control device, wherein a pattern is scanned by the movement of a light spot over the pattern, characterized in that said light source includes discharge lamp means whose beam is reproduced as alternating light variations on the pattern to be scanned by periodically moving over the pattern to be scanned.

2. An arrangement as set forth in claim 1 wherein said discharge lamp means includes a discharge of the lamp and is operated with linear pinch discharge, and at least one electromagnet being operatively connected for the oscillation deviation of said discharge.

3. An arrangement as set forth in claim 2 wherein said discharge lamp means is operated by alternating current voltage.

4. An arrangement as set forth in claim 2 wherein said discharge lamp means is operated by intermittent direct current voltage.

5. An arrangement as set forth in claim 2 wherein a plurality of said electromagnets are arranged radially symmetrically with pairs thereof opposite each other around said discharge.

6. An arrangement as set forth in claim 5 wherein said oscillation deviation of said discharge is achieved by a pair of said electromagnets being arranged with a common axis which is perpendicular to the plane of the pattern, and said discharge being parallel to said plane of said pattern.

7. An arrangement as set forth in claim 6 wherein said discharge lamp means includes a diaphragm used in conjunction with optics for transmitting the light spot to the pattern, and said diaphragm and optics being disposed on the same axis as said pair of electromagnets.

8. An arrangement as set forth in claim 6 wherein said discharge lamp means includes a diaphragm, and mirror means for fading out the part of said discharge which penetrates said diaphragm.

9. An arrangement as set forth in claim 5 wherein said oscillation deviation of said discharge is achieved by at least two pairs of said electromagnets rotatable about the axis of said discharge with said axis of said discharge being normal to the pattern to be scanned.

10. An arrangement as set forth in claim 5 wherein the pattern is spatially scanned by two pairs of said electromagnets around said discharge, the central axes of said pairs being vertically superimposed, and each pair having its own optical control means.

11. An arrangement as set forth in claim 2 wherein said oscillation deviation takes place electrostatically.

12. An arrangement as set forth in claim 11 wherein electrodes are applied to the outer surface of said lamp means.

13. An arrangement as set forth in claim 2 wherein said discharge is beamed by additional electrostatic means.

14. An arrangement as set forth in claim 1 wherein said discharge lamp means includes a vapor lamp.

15. An arrangement as set forth in claim 1 wherein said discharge lamp means includes a gas lamp.

References Cited

UNITED STATES PATENTS

| | | | |
|---|---|---|---|
| 2,853,626 | 9/1958 | Wetzel | 250—202 |
| 2,933,612 | 4/1960 | Cheverton et al. | 250—202 |
| 3,004,166 | 10/1961 | Greene | 250—202 |

JAMES W. LAWRENCE, Primary Examiner

C. R. CAMPBELL, Assistant Examiner

U.S. Cl. X.R.

313—201; 315—25, 348